3,730,752
METHOD OF METAL COATING A FIBROUS SHEET
Alejandro E. Guajardo Garza, Penoles 1515, and Gustavo Guajardo Garza, Colonia del Valle, both of Monterrey, Mexico
Filed July 26, 1971, Ser. No. 165,942
Claims priority, application Mexico, Sept. 29, 1970, 79,165
Int. Cl. C23c 13/02; D21h 1/18
U.S. Cl. 117—11                                          2 Claims

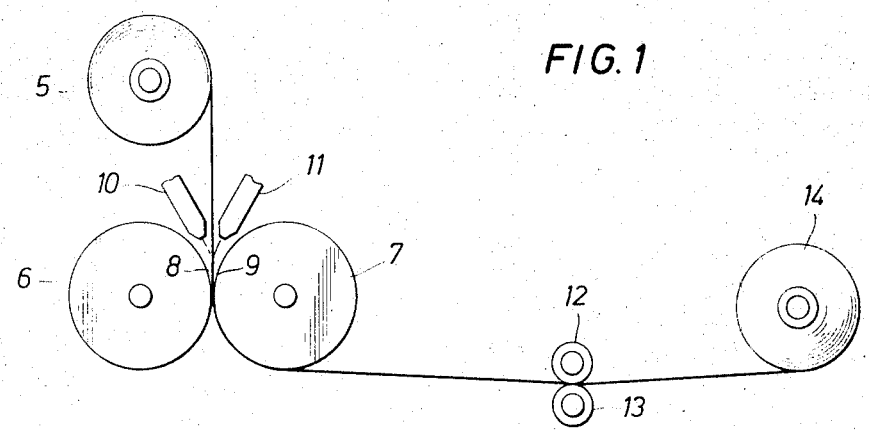
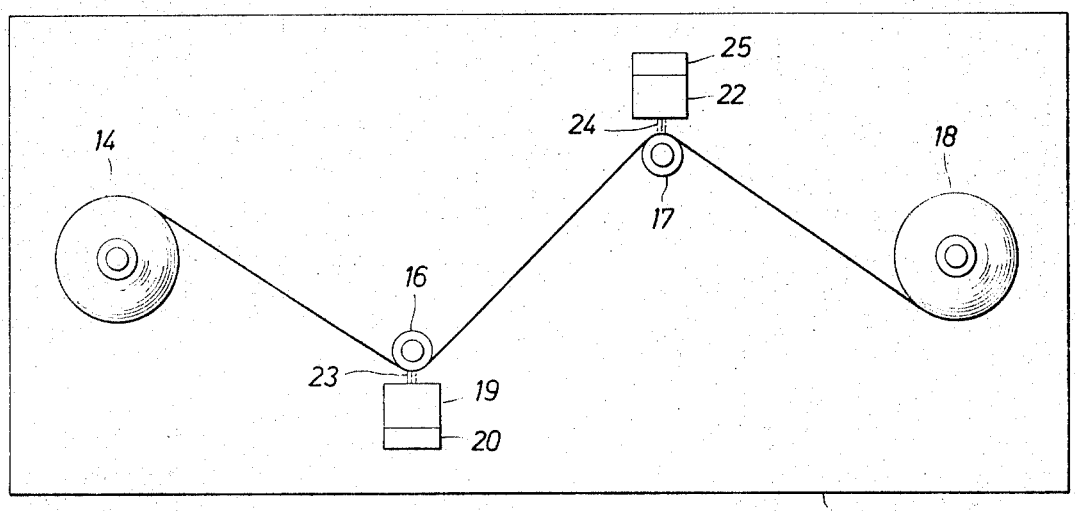
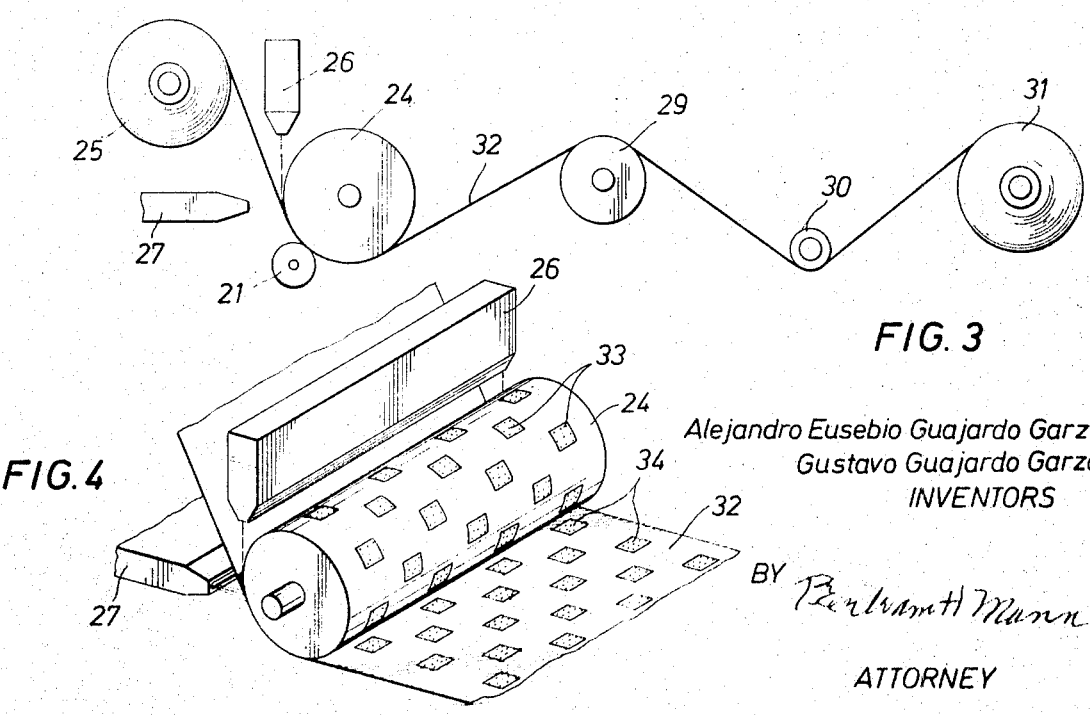
Alejandro Eusebio Guajardo Garza
Gustavo Guajardo Garza
INVENTORS ns of the United States Patent Office 3,730,752
Patented May 1, 1973

ABSTRACT OF THE DISCLOSURE

A rough or porous body, as uncoated paper, paper product, cloth, leather or the like is given an attractive metallized surface, figured or designed or of uniform appearance, by first being given a smooth surface by the application of a film of any of a number of plastic resinous priming materials, then, after solidification of the prime coat, by being given an extremely thin coating of vaporized metal. A design may be inexpensively applied to such a sheet by forming the design in the surface of one or more of the press or thermal rollers used in shaping and curing the plastic film coating, such design being reproduced in the plastic film during its manufacture and reflected in the finished, metallized surface.

BACKGROUND OF THE INVENTION

Base sheeting materials as obtained commercially, as various plastics having relatively smooth surfaces, have been metallized by being exposed to an atmosphere or stream charged with vaporized metal. Such metallized sheets have various uses in commerce, but, mainly for reasons of expense, are not practical for packaging of inexpensive consumer products as cigarettes, chewing gum, candies, etc. Laminated paper and metal foils, particularly those utilizing aluminum, have been widely used for such wrappings. These foils are manufactured by successive rollings of metal stock which may ultimately be reduced to the minimum thickness on the order of from .001–.00025 inch. Consequently such foil surfacings are substantially more expensive, because of necessary manufacturing steps, than vaporized metal surfacings. Moreover, the thinnest of such foils, because of stretching in manufacturing, are characterized by minute pin holes which adversely affect the barrier action, particularly against moisture penetration. Furthermore, the application of a design to such a surface has been possible only with recourse to an extra printing or embossing step.

It has not been possible, heretofore, to apply attractive and inexpensive vaporized metal coatings to paper and paper products or other materials having rough or porous surfaces. While prime coatings of lacquers have been suggested, these, also, have been inordinately expensive, for instance, because of the use of solvents which are lost in the drying step. Moreover, lacquer primers deteriorate in time and tend to crack or break when subjected to rough handling or folding, and the resultant metallized finish is not as attractive as foil finishes.

Accordingly, it is an object of the present invention to provide a substantially less expensive method for the manufacture of highly attractive, metallized surfaces for articles having a rough or porous substrate, for instance, wrappings used in the packaging of inexpensive consumer products, as mentioned above.

Another object is to provide attractive metallized sheeting for use in packaging consumer products which is substantially thinner and involves fewer manufacturing steps than the laminated papers heretofore widely in use for this purpose.

Another object is to provide a method of making inexpensive, yet highly attractive, impermeable and durable metallized sheeting material.

Still another object is to provide a novel inexpensive method of making paper sheeting having a toned, metallized surface.

BRIEF DESCRIPTION OF THE DRAWINGS

In the accompanying drawings which illustrate the novel method,

FIG. 1 is a flow diagram of step 1 of the invention.
FIG. 2 is a flow diagram of step 2 of the invention.
FIG. 3 is a flow diagram of a modified procedure.
FIG. 4 is an isometric view of a part of the apparatus in FIG. 3.

SUMMARY OF THE INVENTION

In accordance with the present invention the surface to be metallized, for instance, the surface or surfaces of base material as uncoated paper, paper board, or cloth, are first sealed by one or more thin prime coatings of a suitable plastic material which may be extruded or sprayed or otherwise applied to the base material. This prime coating is then solidified as by application to one or more thermal rollers, the surfaces of which may be etched in a design for reproduction in the prime coat. Next, the treated surface is exposed in a vacuum chamber to an atmosphere or gaseous stream containing vaporized metal and thereby receives a thin coating of such metal. In the case, for instance, of paper for wrappings and the like, the treated and coated paper remains fully pliable while receiving a highly attractive glossy and/or matte surface coating either continuous or of contrasting design. The adhesion of the metal to the plastic resin coating can be improved by known flame or electrostatic treatment.

DETAILED DESCRIPTION OF THE DRAWINGS

In FIG. 1, showing an exemplary application of the invention, there is shown a roll 5 of feed stock paper or other base material which is fed between thermal rollers 6 and 7. At the entrance to the rollers, a plastic resinous material is fed, as at 8 and 9, through extrusion nozzles 10 and 11 against the surfaces of the paper and is spread smoothly thereon by the rollers. At the same time, the prime coating is solidified by the chilling action of rollers 6 and 7, thence the coated material is fed between tensioning rollers, as at 12 and 13, and to a take-up and storage roll 14. We have successfully tried a number of plastic coating materials, such as casein, latex, vinyl, and nitrocellulose. However, polyethylene plastic or similar polymerized, thermo-setting resinous materials, as polypropylene, polyurethane, polyvinylchloride and polyester appear at the present to be the most satisfactory and, therefore, our preferred prime coating materials. In some cases, multiple prime coatings may be necessary to improve the barrier characteristics of the finished product.

In step 2 (FIG. 2), the take-up roll 14 with its burden of prime coated material is mounted in a vacuum chamber 15 whence the coated material is fed past guide rolls 16 and 17 to a storage roll 18. In the lower and upper parts of the chamber there are mounted vaporizing units conventionally indicated at 19 and 22, to which, for instance, aluminum, is fed and therein vaporized by suitable heating means, symbolically represented at 20 and 25. The metal vapor is applied at 23 and 24 to the primed surfaces of the base material. The second metal vaporizer 22 would be omitted as would one of the extrusion primers if the base material is to be coated on one side only. Equipment for effecting vaporized coating is available commercially and, therefore, need not be further described here. The vaporized metal atmosphere or streams 23 and 24 readily adhere to the prime coated paper sheeting and the metallized sheeting is then wound on finished roll 18.

In FIGS. 3 and 4 the prime coating of resinous material is applied through a nozzle 26 in plastic condition to one side only of the base sheet 32. The sheet is supplied from a storage roll 25 and passes partially around thermal roller 24 against the surface of which it is impelled by an air jet discharged from a nozzle 27 and, in FIG. 3, by a pressure roller 21. The coated sheet then passes over guide rollers 29 and 30 to a take-up roller 31. As shown in FIG. 4, the surface of roller 24, although basically very smooth and hard, has periodically disposed design features, as at 33, of less smoothness, that is, in matte finish. If desired, the entire surface of roller 24 may have a matte finish and rollers 29 and 30 may have surfaces of all over or partial matte finish. As sheet 32 passes about the roller and immediately after addition of the plastic coating thereto, design features 33 are imprinted thereon so that the coated surface will reflect the bright and matte appearance of the roll.

The take-up roll then may be placed in vaporized metal coating chamber 15 and the resultant metallized sheet will likewise reflect the design features in bright and matte areas.

There are a considerable number of advantages in the manufacture of metallized sheeting by means of the above described method. For one thing, it is possible to apply to the base stock nearly pure metal, for instance aluminum, so as to provide better color control than in the case of laminated foil products which require the use of alloys. Color control is also improved and simplified by the use of colored priming material. Another very important advantage is in the substantially reduced cost of metallized material produced by the novel process. This results from the simplified manufacturing procedure, as compared with that utilized in the manufacture of laminated foil and paper, for instance. As stated previously, the thinnest foils available for manufacture of laminated products are approximately .00025 inch in thickness. On the other hand, a dense appearing, attractive vaporized metal coating of one or two percent or less of this thickness can be applied to primed paper or other base material in accordance with our novel process. Nevertheless, the novel coating is substantially imperforate, whereas foils, typically, have many pin holes. Furthermore, the cleaning and annealing steps necessary in preparing metal foils for lamination are omitted in our process.

Still another advantage of the novel process is that the brightness or degree of glossiness or opacity of the metallized surface can be varied from a matte finish to a high gloss. This is achieved by etching or otherwise varying the surface smoothness of a thermal roll in the priming step. Such roll surfacing is reflected in the prime and final coats and may exhibit a design or characters by gradations in glossiness opacity.

While the novel method is particularly advantageous in connection with the manufacture of inexpensive wrappings for various consumer products, it may be used to advantage in many other situations where it is desired to apply an attractive metallized coating to a rough or porous surface to which the vaporized metal coating cannot be applied directly to achieve the attractive glossy appearance which is so desirable. For instance, the reflective coatings of inexpensive mirrors or hangings can be made from sheeting thus coated with vaporized metal. Moreover, any article having a rough or porous surface not adapted to direct applications of vaporized metal may nevertheless be inexpensively provided with an attractive glossy metallized surface in accordance with the method described.

The word "plastic" is used herein, as a noun, in its popular sense signifying a synthetic resinous thermoplastic material and, as an adjective, to signify the fluid state acquired by such material, for instance, by the application of heat, to render it moldable, spreadable, workable, etc.

The particular methods and apparatus used both in applying the smooth prime coating and the metallized finish may be modified in various respects as will occur to those skilled in the art and the exclusive use of these and other modifications as come within the scope of the appended claims is contemplated.

We claim:

1. The method of metal coating a fibrous sheet which comprises the steps of prime coating said sheet with a thermoplastic resinous material in plastic condition, passing the prime coated sheet against a chill roller having a surface of varying smoothness for solidifying the prime coating while applying a textured surface thereto, and applying to the textured surface of the prime coat a coat of vaporized metal.

2. The method described in claim 1 in which the surface of said chill roller is provided at least in part with a matte finished for transfer to said prime coat prior to the metallizing step.

References Cited
UNITED STATES PATENTS

| | | | |
|---|---|---|---|
| 3,113,888 | 12/1963 | Gold et al. | 117—107 X |
| 3,480,464 | 11/1969 | Lacy | 117—107 X |
| 3,463,659 | 8/1969 | Dragoon et al. | 117—107 X |
| 3,043,728 | 7/1962 | Stauffer | 117—71 R X |
| 3,231,405 | 1/1966 | Mates et al. | 117—107 X |
| 3,281,257 | 10/1966 | Rosen | 117—11 X |
| 3,085,025 | 4/1963 | Eaton | 117—11 X |
| 2,479,094 | 8/1949 | Bicknell | 117—11 X |

RALPH HUSACK, Primary Examiner

U.S. Cl. X.R.

99—171 LP; 117—64 R, 71 R, 76 P, T, R, 107, 119